UNITED STATES PATENT OFFICE.

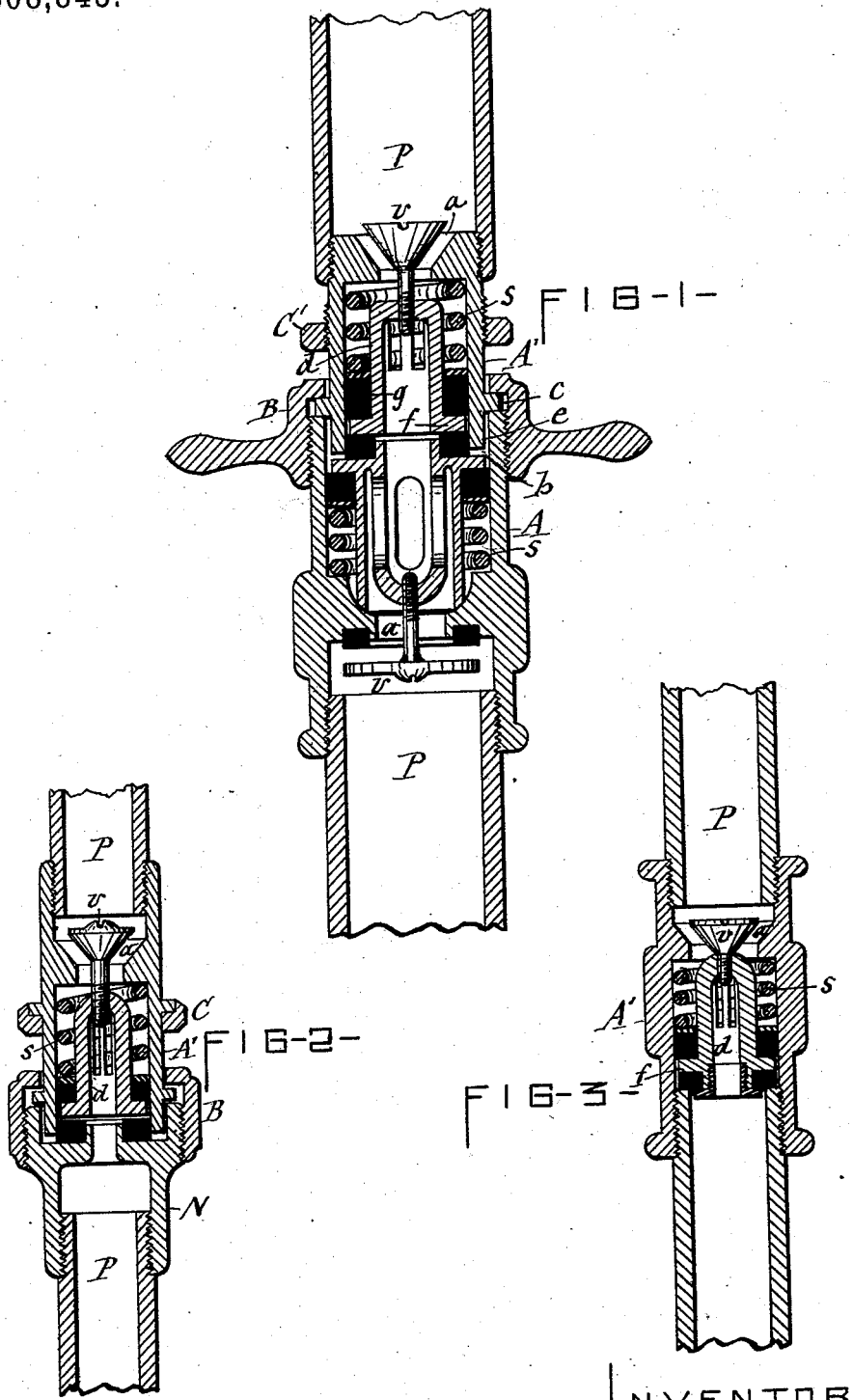

ROLAND S. KELSEY, OF SYRACUSE, NEW YORK, ASSIGNOR TO THE KELSEY MANUFACTURING COMPANY, OF SAME PLACE.

PIPE-COUPLING.

SPECIFICATION forming part of Letters Patent No. 308,843, dated December 2, 1884.

Application filed December 18, 1883. (No model.)

*To all whom it may concern:*

Be it known that I, ROLAND S. KELSEY, of Syracuse, in the county of Onondaga, in the State of New York, have invented new and useful Improvements in Pipe-Couplings, of which the following, taken in connection with the accompanying drawings, is a full, clear, and exact description.

This invention consists, essentially, in the combination, with a hose or pipe coupling, of a valve arranged in the passage of the coupling-case and sustained in an open position by a bearing of the foot of the valve on the part coupled to the said case, said valve being caused to automatically close the passage through the coupling-case in the operation of uncoupling the hose or pipe, and thus dispensing with the use of stop-cocks heretofore required to permit of the aforesaid uncoupling, especially when the hose or pipe is constantly charged with fluid or gas.

The invention also consists in certain auxiliary devices connected with the aforesaid coupling, all as hereinafter fully described, and specifically set forth in the claims.

The annexed drawings represent longitudinal sections of three different styles of couplings embodying my invention.

Similar letters of reference indicate corresponding parts.

In couplings where the passage through the hose or pipe has to be closed in both directions before uncoupling the same, I employ a duplex coupling-case, A A', screwed onto or connected in any suitable and well-known manner to the two sections of the pipe to be coupled, the two cases A A' being coupled together by means of the usual nut, B, working on the exteriorly-threaded end of one case, and having on its opposite end an inward-projecting shoulder engaging a collar, c, on the exterior of the other case. Each of said cases is provided on the end adjacent to the pipe connected therewith with a passage or port, a, on which is seated a puppet-valve, v, which lifts toward the pipe. To the said valve is connected a foot or yoke, d, arranged in the interior of the case, the yokes of the two valves being of such a length that when the two cases are drawn together by the coupling-nut B the ends of the yokes meet each other and push the two valves off their seats on the ports a a, as illustrated in Figure 1 of the drawings.

The yokes and valves may be of different forms, as shown; but in either case they must be provided with a flange, f, to serve as an end bearing for the yoke, and also as a seat for a suitable packing, g, and as a resistance to a spiral spring, s, which bears with one end on a washer placed on the packing g, and with the opposite end against a shoulder around the port a a. This spring exerts a pressure on the packing g, and thus tightens the same.

In disconnecting the two cases A A' from each other the valve-yokes are relieved of their before-described end bearing, and the springs are thus allowed to force the yokes toward the disconnected ends of the cases, and thus close the ports a a; hence the passage through the pipe from either direction is closed simultaneously and automatically with the uncoupling of said pipe.

In order to insure the closing of the valves before completely separating the coupling, I provide one of the coupling-cases with an end extension, e, which enters the other case, and is of such a length that before it is withdrawn from the latter case the valves have closed the ports a a, suitable packings being applied to the various joints to prevent leakage. The case A', which has the collar c, I provide with a nut, C', between the aforesaid collar and the attaching end of the case, said nut constituting an adjustable shoulder designed to be encountered by the nut B in the operation of unscrewing the latter from the case A, and thus crowd said two cases asunder, thereby allowing the inclosed valve v to close the passage a in the case before the coupling-nut B is completely unscrewed from the case A. In cases where the pressure of the substance conducted by the pipe is in one direction only I employ a single valve, v, as illustrated in Figs. 2 and 3 of the drawings. The yoke of said valve is provided with the flange f, hereinbefore described, to receive the pressure of the spring s and to serve as a bearing on the part coupled to the case A. Said coupled part may consist either of a nipple, N, attached to the end of one of the pipe-sections, as shown in Fig. 2 of the drawings, or the pipe itself, as illustrated in Fig. 3 of the drawings, in which latter case the coupling consists simply of a barrel, into the ends of which the pipe-sections are screwed.

Having described my invention, what I claim as new, and desire to secure by Letters Patent, is—

1. The combination, with a pipe-coupling, of a valve arranged in the passage of the coupling-case, a yoke connected with the valve, and provided with an end bearing, $f$, and a spring, $s$, for seating the valve on the port automatically with the disconnection of the coupling, substantially as set forth and shown.

2. In combination with the cases A A′, valves $v$, springs $s$, and coupling-nut B, the shoulder or nut C′, substantially as shown, for the purpose set forth.

In testimony whereof I have hereunto signed my name and affixed my seal, in the presence of two attesting witnesses, at Syracuse, in the county of Onondaga, in the State of New York, this 4th day of August, 1883.

ROLAND S. KELSEY. [L. S.]

Witnesses:
F. H. GIBBS,
WM. C. RAYMOND.